United States Patent [19]

Potter

[11] 3,793,635

[45] Feb. 19, 1974

[54] LOCATING VEHICLES USING THEIR VOICE TRANSMISSIONS

[75] Inventor: Basil E. Potter, Amherst, N.Y.

[73] Assignee: Sierra Research Corporation, Buffalo, N.Y.

[22] Filed: Dec. 8, 1972

[21] Appl. No.: 313,526

[52] U.S. Cl. ... 343/112 R, 235/150.272, 343/100 CL, 343/112 TC
[51] Int. Cl. ............................................. G01s 5/06
[58] Field of Search ... 343/100 CL, 112 R, 112 TC; 235/150.272

[56] References Cited
UNITED STATES PATENTS
3,419,865 12/1968 Chisholm ...................... 343/112 TC
3,680,121 7/1972 Anderson et al. ............. 343/112 TC

*Primary Examiner*—Maynard R. Wilbur
*Assistant Examiner*—Richard E. Berger
*Attorney, Agent, or Firm*—Alexander & Dowell

[57] ABSTRACT

A system for locating plural mobile units, vehicle aircraft or marine, using their voice or other intelligence transmissions to indicate their respective locations relative to at least three fixed-position receivers. These transmissions are intermittently on the air, sometimes interfering and sometimes not, and the system uses a correlation technique for determining when the transmissions received at the spaced receivers are all initiated by the same mobile unit. If so, the signals received are narrow-band filtered to recover a component of their modulation which can be used as an indication of the time of arrival of the transmission at each of the receivers. These filtered components are then delivered to a computer which determines the location of the mobile unit using well-known time-of-arrival solutions. Conversely, if several mobile units are transmitting at once, their signals will not successfully correlate and no computations are performed during such periods of interference.

6 Claims, 3 Drawing Figures

LOCATING VEHICLES USING THEIR VOICE TRANSMISSIONS

DISCLOSURE

This invention relates to improvements in systems for computer locating mobile units, such as vehicles or aircraft or boats, using the times of arrival of their voice transmissions at multiple mutually spaced receiving stations which are fixed in position and linked to a common computer which then determines the location of the vehicle by using the relative times of arrival of the voice signals or certain filtered signal components thereof.

The prior art provides a large number of time of arrival computer systems for locating mobile units with respect to three or more receiving stations. Many of these systems use coded pulse transmissions from the various mobile units for determining their locations, for instance, as shown in Chisholm U.S. Pat. No. 3,419,865 and Moorehead et al. U.S. Pat. No. 3,518,674, and others. However, these systems all require alteration of, or additions to, the communications equipment commonly found in commercial or government vehicles, and such additions greatly increase the cost of providing an operative system, such as might be used, for example, for locating police vehicles, taxis or busses in a metropolitan area.

It is a principal object of this invention to provide an economical system in which no addition or alteration is required in the mobile units themselves, and in which their normal voice transmissions are used by the computer system to automatically determine the locations of the mobile units.

Some of the prior art systems employ time-slot techniques for the purpose of preventing confusion resulting from overlapping transmissions by the various mobile units, such a system being shown in Chisholm U.S. Pat. No. 3,419,865. However, time-slot systems imply the use of synchronized time clocks in the various vehicles and a synchronizing system for keeping the time slots which they generate in step with the central time slot system at the computer. The use of such expedients to prevent mutual interference between transmissions of the various mobile units greatly increases the cost of the system, as well as its complexity.

It is an important object of the present invention to provide a novel system in which voice communications by the various mobile units can randomly occur in point of time, for instance as when various taxi cab units call in to their dispatchers, and in which the present novel system provides means whereby a preliminary determination can be made before each computation as to whether or not multiple vehicles are transmitting simultaneously such that their receive signals overlap in point of time. If such overlapping occurs, the interference signals are not gated to the computer and the system waits until such time as only a single unit's transmission is being received at the time of arrival receivers which are connected to the computer. Thus, in effect the present invention provides a kind of filter system which first monitors the signals being received at the receivers, and then permits these signals to be gated to the computer only if a single vehicle is initiating the voice signals being received at that particular moment.

It is a major object of this invention to combine the above confusion-eliminating technique with a novel filtering technique for recovering from voice transmissions certain signal components from which time of arrival can be calculated to provide a simpler system for locating vehicles without resorting to time slot multiplexing. It is known in the prior art to use the transmission of a tone from a mobile unit whose position is about to be determined by time-of-arrival techniques, and then to filter that tone at each receiver in order to recover signals which can be used to determine location. When used by itself, this filtered-tone technique has the disadvantage that it does not eliminate interference from two vehicles transmitting the same tone simultaneously, or in such temporal proximity that confusion occurs at the computer because of erroneous association of the tones received from several vehicles.

The prior art also suggests the use of correlation techniques designed to separate desired signals from interfering signals. This kind of technique has been combined with the use of signals which are encoded in a binary manner and then shifted in time until they match with signals being received at other receivers. One major advantage of this invention is that the step of correlation is performed on the whole voice transmission which has very great uniqueness, rather than upon a mere component thereof such as an audio tone or a binary encoded addition to the transmission.

It is still another major object of this invention to provide means for blocking the delivery of time-of-arrival signals to the computer by gating them off whenever correlation shows the simultaneous existence of several signals eminating from different mobile sources.

It is a further important object of the invention to eliminate the need for the transmission of tones or special pulse codes from the vehicle by providing a novel filtering technique in which the voice spectrum which is being transmitted from the particular vehicle is filtered to provide narrow-band output components, useful in a manner analagous to tone signals for marking the times of arrival of the transmissions at the various receivers.

The correlation used in the present system comprises relatively coarse correlation intended only to determine whether all received signals are transmitted by one and the same mobile unit at that moment. It is of course true that two different voice signals eminating from two different sources and received at several receivers will usually fail to correlate since their relative travel times to each of the receivers will generally be different, and therefore their composite waveforms will be different at those receivers. Although this is not always strictly true, it is true for such a high proportion of the time that the computer can easily sort out and dispose of erroneous position determinations employing any one of several frequently used approaches, including the well known approach in which the position of a vehicle being tracked is allowed only to vary in an essentially predictable manner and through small increments between position determinations. Computer systems also frequently employ averaging processes by which occasional large deviations can easily be eliminated. Once a determination has been made that the incoming signals accepted at the various time-of-arrival receivers all originate from a single mobile unit, then the computer determines their precise times of arrival using filtered voice components which actually comprise narrow spectral portions of the voice transmission passing to the computer through gates which are enabled only when it has been determined that the transmissions come from a single mobile unit source. This improved combination of techniques comprises the inventive concept, but the computer system with which it cooperates is considered to be prior art, for example as disclosed in Chisholm U.S. Pat. No. 3,419,865 or Moorehead et al. U.S. Pat. No. 3,518,674 or any one of a number of other time-of-arrival patents.

Other objects and advantages of the invention will become apparent during the following discussion of the drawings, wherein.

Figure 1:
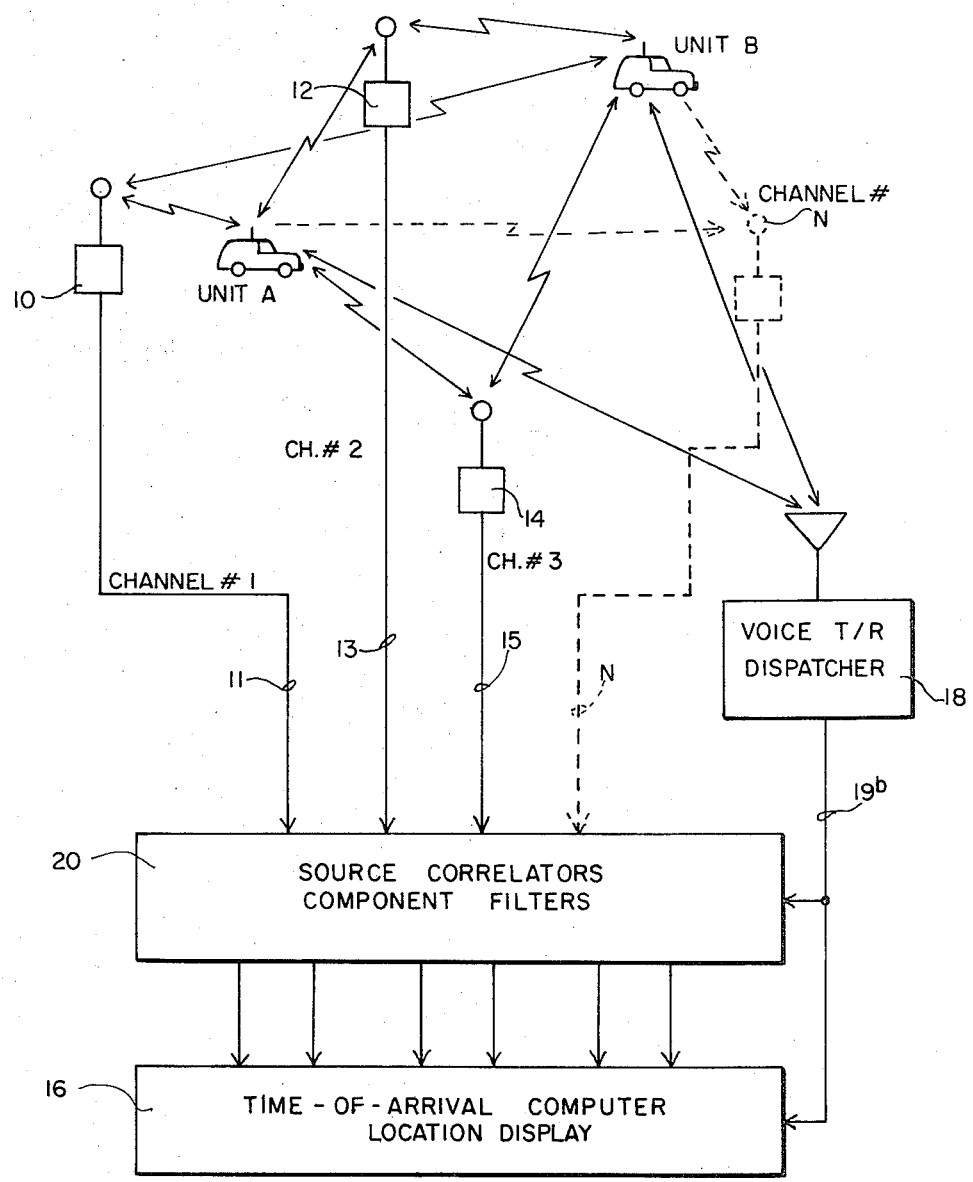
FIG. 1 is a diagram of an over-all illustrative system with two vehicles located within its receiver array.

FIG. 1 is a diagram of an entire mobile unit locating system according to the present invention including three or more mutually spaced time-of-arrival receivers 10, 12, and 14 connected to computer and display means 16, which comprise essentially prior art means having the required arithmetic, storage, and programs, as well as a suitable mobile unit locator display, for instance of the type shown in one of the above mentioned patents or others.

Figure 2:
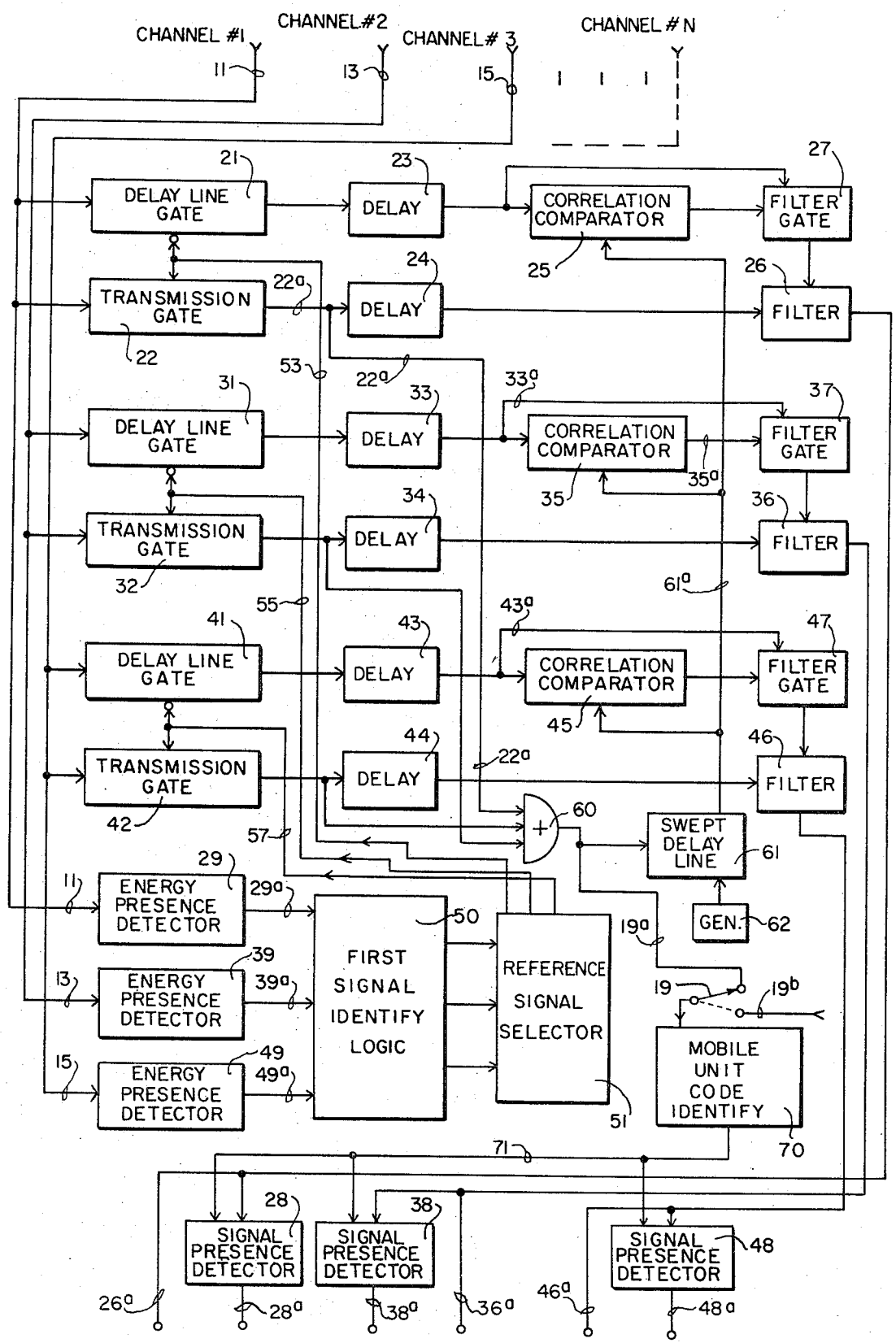
FIG. 2 is a block diagram of a source-correlation and voice-filter unit comprising a major component of the system as shown in FIG. 1.

The novelty in the present invention resides in the voice communication block 20 of the diagram of FIGS. 1 and 2 which includes means for correlating the various signals received from the receivers 10, 12 and 14 to determine whether they are all from the same source taken in combination with narrow-band filter means in each channel for selecting a predetermined component of the speech passing through that channel to provide a time-of-arrival signal which serves to take the place of prior-art specially generated tone signals or pulse encoded signals by which the system can determine the location of the mobile unit being received at that moment. The various channels coupling the receivers through the correlation and filter unit 20 and into the computer are labelled 11, 13, and 15. A block diagram of the correlation and filter unit 20 appears in FIG. 2 and will be described hereinafter with reference thereto. FIG. 1 shows two mobile units labelled A and B, although it is assumed that a far larger number of vehicles will participate in a practical system.

Basically, the correlation and filter unit 20 which is the subject of the block diagram in FIG. 2 performs two functions. First, it serves always to block the passage of signals from all of the channels 11, 13 and 15 to the computer 16 whenever more than one mobile unit is talking via its voice communication system, for instance to its ground dispatcher with whom it communicates by way of the ground transceiver 18. Whenever this happens the correlator fails to find coincidence and does not enable the gating means to pass their signals to the computer, such signals being blocked when they cause interference among the signals on the incoming channels 11, 13 and 15. The second function performed by the correlator and filter 20 shown in FIG. 2 is to derive a very narrow-band tone signal from the incoming voice communication in each channel which tone signal is then used when present by the computer in the determination of the location of the mobile unit by time-of-arrival computations.

FIG. 2 shows the channel wires 11, 13 and 15 bringing the received RF modulated with voice communication into the correlator and filter 20. In each of the three illustrated channels shown in FIG. 2 there are included two mutually exclusive routes by which the communication signal from that channel can progress through the correlator and filter 20 and proceed to the computer. For instance, in the uppermost channel served by the wire 11 the communication signal can pass rightwardly either through the gate 21 or through the gate 22 on its way to the output filter 26. For instance it can pass to the right through the gate 21, the delay line 23, the correlation comparator 25 and the gate 27. Alternatively, the same signal can pass through the gate 22, the delay 24 and then directly on to the filter 26. It goes the former route if it is not the first channel in which the signal was received, or it goes the latter route if the transmission was first received in this channel. However, the energy arriving in channel No. 1 by way of the wire 11 goes one way or the other, but not both routes at once.

Likewise, channel No. 2 and channel No. 3 also contain similar components so that, for example, the energy arriving on the channel wire 13 can alternatively flow out through the filter 36 either by way of the path 31, 33, 35, 37, and 36, or alternatively through the path 32, 34, and 36. Likewise, there are two alternative paths in channel No. 3 including the paths 41, 43, 45, 47, and 46, or alternatively including the paths 42, 44 and 46. These three channels are of course associated with separate receivers and the signals remain separate in each. It is also to be noted that while only three channels are shown in the illustrative embodiment of the present invention, in practice there would probably be a greater number N of time-of-arrival receivers, each with its own input channel and separate correlator and filter channels going to the computer.

For the sake of simplicity in understanding the operation of FIG. 2, let it be assumed that only one of the mobile units A or B as shown in FIG. 1 is transmitting at the present time and that the other unit is quiet. This being the case, for instance during time T3 in FIG. 3, one of the receivers 10, 12 or 14 will presumably receive the transmission from the mobile unit A earlier than the other two receivers, and again for the sake of illustration let it be assumed that the vehicle A is closer to the receiver 10 than it is to the other receivers 12 and 14. Therefore, channel No. 1 will have a signal appear on wire 11 before either of the other channels will receive the same signal, and this signal will be applied to the gates 21 and 22, the gate 21 normally being enabled when the wire 53 is low and the gate 22 normally being disabled by the zero level on wire 53. Similarly, gates 31 and 41 in the other two channels are normally enabled and gates 32 and 42 are normally blocked. The appearance of received energy in channel No. 1 on wire 11 delivers output on the wire 29a from the energy-presence detector 29 which has been dormant until the appearance of the signal on the wire 11. The wire 29a enables the first-signal identification logic circuit 50 which then delivers an output through the reference signal selector gate 51 to energize the wire 53, and thereby disable the delay line gate 21 and enable the transmission gate 22. As a result thereof, the intelligence signal appearing in channel No. 1 on wire 11 passes through the transmission gate 22 and through the wire 22a into the delay line 24, and later into the filter 26, the delay line 24 and the filter 26 being discussed further hereinafter. However, for present purposes, it is important to note that the output on wire 22a, containing a portion of the intelligence signal from channel No. 1 also passes undelayed through an OR gate 60 and into a swept delay line circuit 61 which sweeps the intelligence signal passing therethrough back and forth in phase relationship with respect to signals now arriving in the other two channels. As long as the channel No. 1 signal is present it is swept back and forth in real time by the circuit 61 for the purpose which is about to be discussed. The generator 62 provides a recurring sweep voltage waveform for progressively changing the delay introduced by the swept delay line 71, and the generated waveform may be selected as desired from a number of possibilities such as triangular, sawtooth or even sinusoidal, etc.

Meanwhile, the other two channels will begin receiving the same intelligence signal, slightly later in time than the first channel and the first-signal identification logic 50 will have recognized that the first channel to have a signal appearing on the output 29a of its energy presence detector was channel No. 1, and not channel No. 2 or channel No. 3. Therefore, output signals on the wires 39a and 49a from the presence detectors 39 and 49 will be ignored, so that no output will appear from the selector circuit 51 either on the wire 55 or on the wire 57, thereby leaving the delay line gates 31 and 41 enabled, while the transmission gates 32 and 42 are disabled. As a result of the above stated enabling of the gates 22, 31 and 41 and the disabling of the gates 21, 32, and 42, the input of channel 11 now appears on wire 22a, passes through OR gate 60 and through the swept gate 61 and comes out delayed on wire 61a and is inserted into two of the correlation comparators 35 and 45 as one input to each thereof. The signal on the wire 61a is also available to the comparator 25 which, however, is dormant at the present time since the gate 21 is blocked.

The other input signals to the comparators 35 and 45 for comparison with the swept channel signal appearing on wire 61a comprise the signals being received in the corresponding channels No. 2 and No. 3, via wires 13 and 15. Thus, the signal arriving on channel wire 13 in FIG. 2 passes through the gate 31 and through a delay circuit 33 and is entered into the input to the comparator 35 on wire 33a where it is compared for coincidence with the swept channel No. 1 signal appearing on wire 61a in that same comparator. Similarly, the intelligence signal being received in channel No. 3 on wire 15 is being passed through the gate 41 and through the delay line 43 and via the wire 43a into the comparator 45 where it is also being compared with the swept signal from channel No. 1 appearing on wire 61a.

The output of channel No. 2 arriving as an intelligence signal on wire 13 is also delivered by the wire 33a to a filter enabling gate 37 where it is blocked until the comparator 35 detects coincidence between an increment of the swept signal from channel No. 1 and a similar increment from channel No. 2 appearing on wire 33a. When this happens, an output from the correlation comparator 35 on wire 35a enables the filter gate 37, and the signal on wire 33a from the channel No. 2 receiver 12 is delivered from the output of the gate 37 into the filter 36.

The third channel, and any subsequent channel (not shown), performs a similar function. The intelligence signal being received by the receiver 14 appears on the wire 15 and passes through the delay line gate 41 and through the delay line 43 and out through the wire 43a where it is applied to one input of the gate 47 and is also applied to the correlation comparator 45 for comparison with the swept channel No. 1 signal arriving on wire 61a. When an increment of coincidence is detected for the channel No. 1 swept signal with the channel No. 3 signal, an output is enabled from the filter gate 47 and passes through the OR gate into the filter 46. Moreover, in channel No. 1 the intelligence signal passing through the enabled transmission gate 22 and through the delay line 24 likewise passes through the filter 26. Thus, all 3 filters 26, 36 and 46 have received intelligence signals from the receivers 10, 12 and 14, and the moments of arrival of these signals at the various filters are determined partly by the differences in transit times through the air from the mobile unit A to the respective receivers 10, 12 and 14, but on the other hand, the relative moments of arrival at the filters 26, 36 and 46 of the correlated intelligence signals in the respective channels is also determined partly by the delay line 24, by the delay line 33 and by the delay line 43. These are the three delay lines through which the intelligence signals pass on their way to the filters 26, 36 and 46, in the situation under current discussion. However, these three delay lines 24, 33 and 43 are calibrated so as to balance out inequalities in their travels through the circuitry of the system, so that the relative times of arrival of the intelligence signals which have been successfully correlated at the filters 26, 36 and 46 will be dependent solely upon their transit times through the air from the mobile unit A to the three receivers 10, 12 and 14.

Moreover, these delay lines must provide a substantial but equal amount of delay for each arriving signal for another reason. These delay lines are inserted in the system in order to delay the arrival of the energy in the channels until it can be determined whether or not coincidence will be detected as between the various signals. Thus, the delay lines introduce a finite delay permitting the elapse of sufficient real time for the correlator system 20 shown in FIG. 1 to determine whether or not the intelligence signals are from a single source and therefore should be delivered to the computer.

It should be noted that in the example being discussed the delay lines 24, 33 and 43 are operative simultaneously only because the intelligence signal arrived in channel No. 1 before it arrived in any of the other two channels. However, if channel No. 2 had been the first to receive an intelligence signal on the wire 13, then its gate 31 would have been disabled and its gate 32 would have been enabled, and in this situation the three delay lines which are operative would have been 34, 23 and 43. Similarly, if channel No. 3 had been the first to detect an intelligence signal, then its gate 44 would have been used with gates 23 and 33 in the other two channels. Thus, all 6 delay lines are necessary to provide a three-channel working system. Thus far, the circuitry described with reference to FIG. 2 has served only to establish that a single source of intelligence signal is being picked up in each of the three receivers 10, 12 and 14. A discussion of what happens when two separate mobile units are transmitting at the same time will be presented hereinafter in connection with FIG. 3.

Returning to FIG. 2, the three filters 26, 36, and 46 comprise narrow band pass filters tuned to pass identical frequency components in the speech range, perhaps 400 $H_z$ as an example. The circuit shown in FIG. 2 has two outputs for each channel. The outputs 26a, 36a, and 46a are analog outputs comprising the filtered audio frequency component, whereas the outputs 28a, 38a, and 48a comprise binary outputs of the signal presence detectors 28, 38 and 48, these signals being control signals delivered to the computer. Thus, at each computer input the computer receives a control signal such as on a wire 28a, 38a, or 48a indicating that there is an output available in that channel at the present time from which time-of-arrival can be computed, and in each computer input channel an audio tone of for example 400 $H_z$ is supplied to the computer by one of the wires 26a, 36a, and 46a.

The nature of each of the filters 26, 36, and 46 is such as to sharply recover substantially a single-frequency from the voice communication spectrum, and then provide this frequency as a time-of-arrival tone to the computer. The processing of these tones serves to determine location of the vehicle. As pointed out above, there are prior art systems in which the various vehicles emit specially generated tones which are picked up and recognized by filters at the various receivers, so that these tones can be used to locate the vehicles using the times of their arrivals at the receivers. The present system, seeking to avoid the necessity of adding anything to the vehicle which is not already found therein in the form of voice communication equipment, employs components of the voice spectrum from which to recover a tone by narrow band filtering using the filters 26, 36, and 46.

In the event that the automatic portion of the system must also identify the vehicle automatically, the vehicle can be provided with means for placing a binary identification code on its transmitted carrier, which can then be picked off and detected by a code identification circuit 70. The code identification circuit 70 is conveniently connected with the output on wire 19a of the OR gate 60 so as to identify the incoming first-received intelligence message as to its source, and when such identification occurs, output on the wire 71 will enable another input to each of the signal presence detectors 28, 38, and 48 in such a way that control outputs to the computer therefrom will appear only when the code of a particular vehicle is recognized by the identification circuit 70. As an alternative, in view of the fact that the vehicle is already in voice communication with a dispatcher at the radio station 18, it is possible to have the dispatcher enter by manual means an encoded identification into the system 20 via the wire 19b. This wire enters the circuit 20 of FIG. 2 from the right-hand edge thereof and can be coupled through a selector switch 19 into the code identification circuit 70. Thus, means is provided by which the communications operator or dispatcher can indicate to the computer the identification of the vehicle whose location is presently being determined. The wire 19b is also shown in FIG. 1 as entering the computer 16 so that the identification can be stored by the computer together with the momentary location of the mobile unit.

Figure 3:
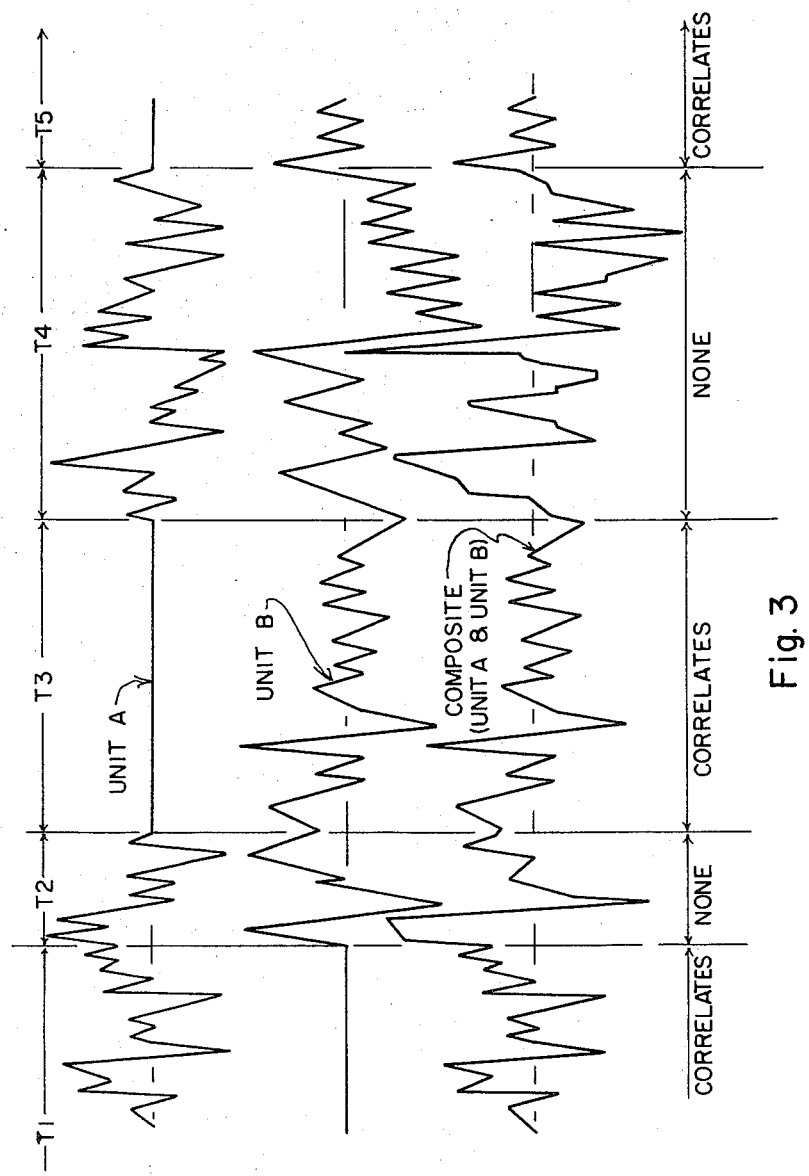
FIG. 3 is a diagram illustrating the failure of source correlation when two sources are transmitting communications which arrive simultaneously at a receiver and combine to form a composite waveform.

FIG. 3 shows three collimated traces, the first one showing modulated transmission from the unit A and the second one showing modulated transmission from the unit B, and these transmissions being in part exclusively on the air, and in part simultaneously overlapping. For instance, during the interval of time T1 the upper trace representing transmissions by the mobile unit A is on the air, but the middle trace representing mobile unit B is silent. Hence, the composite trace located below the other two corresponds in its waveform exactly with what is shown in the trace for mobile unit A, and therefore, when it is swept, it will correlate with traces appearing in the other two intelligence signal channels. However, during the interval of time T2 both mobile unit A and mobile unit B will have intelligence signals being received in the same interval, and therefore, the composite trace does not resemble either of these units as can clearly be seen by comparing the lowermost trace during time interval T2 with the other two traces located there above. During time interval T3 the unit A is silent and the unit B is transmitting, and therefore, correlation can be had with signals arriving in other channels and eminating only from unit B since the lowermost composite trace is substantially identical to the center trace arriving from unit B. During time interval T4 both mobile units are simultaneously transmitting, and therefore, their composite traces will not correlate in the other channels. The principal reasons why correlation fails as between the various channels when two mobile units are transmitting at the same time lies in the fact that the units are different distances from the several receiving stations. In other words, the relative distances between mobile unit A and the first receiving station 10 and the mobile unit B and that same receiving station are entirely different from the relative distances between those two mobile units and either of the other receiving stations. Therefore, when the composite of the signals from mobile units A and B are added at one station, their mutual phase relationships as compared with their sum at any of the other stations is different, and therefore, the composite traces do not resemble each other and cannot be correlated. Stated otherwise, correlation of two signals is a complex function involving both the amplitudes $\alpha 1$ and $\alpha 2$ and the phases $\phi 1$ and $\phi 2$ of the signals as demonstrated by the following:

$$\alpha 1 \sin(\omega t + \phi 1) + \alpha 2 \sin(\omega t + \phi 2)$$
$$= A \sin\left(\omega t + \sin^{-1} \frac{\alpha 1 \sin \phi 1 + \alpha 2 \sin \phi 2}{\sqrt{\alpha_1^2 + \alpha_2^2 + 2\alpha 1 \alpha 2 \cos(\phi 1 - \phi 2)}}\right)$$

Whenever either $\phi 1$ or $\phi 2$ is present, the phase is not a function of $\alpha 1$ or $\alpha 2$; but when both $\phi 1$ and $\phi 2$ are present, the phase is a function both of $\alpha 1$ and $\alpha 2$. Thus, if only one vehicle is transmitting so that only one $\phi$ is present, correlation will occur; but if several vehicles are transmitting so that $\phi 1$ and $\phi 2$, and maybe others, are present at the receiver, then there will generally be failure of phase correlation, especially failure of correlation which would be sustained for a sufficient interval of time to permit the recovery of a filtered component of the voice communication.

Consequently, there is very little tendency for correlation to be successful when two vehicles are simultaneously transmitting intelligence signals. If any such correlation should instantaneously occur, its duration would be extremely brief. The present system requires coincident correlation over a finite increment of time before the computer can be signalled to accept the filtered audio components being delivered from the filters 26, 36 and 46 and representative of a mobile unit's location. In FIG. 3, during the time interval T5, only the mobile unit B is transmitting, and therefore, correlation is again experienced during this interval.

The present invention is not to be limited to the exact embodiment shown in the drawings, for obviously changes may be made therein within the scope of the following claims:

I claim:

1. A system for locating plural mobile units of the type having three or more mutually spaced fixed-position receivers tuned to receive modulated transmissions from the mobile units and the receivers being coupled by separate channels to computer means programmed to compute the locations of the mobile units based upon the relative times of arrival at the receivers of components of their respective transmissions, comprising:
   a. signal gating means in the channels operative when enabled to pass the received transmissions in the channels toward the computer means;
   b. delay means in the channels operative to delay the passage of said transmissions through the channels for a fixed interval of time;
   c. means operative during said interval between reception of a transmission and its passage toward the computer to correlate the transmissions being received in the channels by displacing them relative to each other in time and comparing them for coincidence, and operative upon a finding of coincidence to enable said gating means; and
   d. filter means in each channel connected respectively to receive said transmissions from said gating means, and responsive to pass a predetermined component of the modulation of the transmissions, and coupled to deliver said component from each channel to the computer means as a time-of-arrival indicating signal.

2. The system as set forth in claim 1, wherein the transmissions received from the mobile units are voice modulated, and the filter means in each channel comprise narrow passband filters all tuned to the same frequency component in the voice spectrum when said component is present in correlated transmissions, whereby components in the several channels are passed to the computer means.

3. The system as set forth in claim 2, including means at the output of each channel for detecting when a filtered component is present in that channel and for thereupon delivering a control output signal to the computer to indicate the presence of such input to it.

4. The system as set forth in claim 3, wherein each mobile unit transmission includes a unit-identifying message, and the system further includes means responsive to received transmissions in the channels for recognizing an identifying message and for enabling said detecting means for delivering its control signals.

5. The system as set forth in claim 1, said correlate means comprising energy presence detector and logic means associated with the channels and operative upon the reception of messages to detect the first channel in which an incoming transmission is received; means responsive to the detection of energy in a first channel and operative during said delay interval to displace the transmission received in that channel progressively toward bringing it into coincidence with the transmission as received subsequently in the other channels, and to enable their gating means when coincidence occurs to pass the received transmission to the filter means.

6. A system for locating plural intermittent voice-transmitting mobile units with respect to three or more receivers disposed in fixed mutually spaced locations and coupled to computer means operative to compute the locations of the mobile units from the relative times of arrival of their voice transmissions via separate channels interconnecting the receivers with the computer means, comprising:
   a. means for establishing the presence in the channels of transmitted energy emanating from a single one of said mobile units, and comprising means for relatively shifting part of the received energy in time while comparing the energy in the channels for coincidence, and means responsive to coincidence in the channels for passing another part of the energy in the channels toward the computer means with the relative time-of-arrival relationships thereof unshifted; and
   b. means in each channel for filtering said another part of the energy in each channel to recover from it a narrow band component, and for delivering the component recovered from the energy in each channel to the computer means as an indication of the relative times of arrival of the transmitted energy at each channel.

* * * * *